United States Patent [19]

Wu et al.

[11] 3,719,671

[45] March 6, 1973

[54] 10-IMIDOYLPHENOTHIAZINES

[75] Inventors: Yao Hua Wu; Walter G. Lobeck, Jr., both of Evansville, Ind.

[73] Assignee: Mead Johnson & Company, Evansville, Ind.

[22] Filed: May 27, 1971

[21] Appl. No.: 147,667

[52] U.S. Cl....260/243 A, 260/243 AA, 260/326.5 J, 260/561 R, 260/561 H, 424/247
[51] Int. Cl. ............................................C07d 93/14
[58] Field of Search.......................................260/243

[56] References Cited

UNITED STATES PATENTS 3,419,553  12/1968  Bernstein et al.....................260/243

*Primary Examiner*—Harry I. Moatz
*Attorney*—Robert E. Carnahan and Robert H. Uloth

[57] ABSTRACT

Novel 10-imidoylphenothiazines are prepared by reacting a phenothiazine which may have hydrogen, trifluoromethyl, methylthio, alkyl, alkoxy or halogen substituents in the 2 or 4 position with a carboxamide selected from the group consisting of amides and lactams in the presence of phosphorus oxychloride. Typical embodiments are 10-[2-(5-methyl-1-pyrrolinyl)]phenothiazine and 10-[2-(5,5-dimethyl-1-pyrrolinyl)]phenothiazine. The phenothiazine amidine products are useful as intestinal relaxant and antithromogenic agents.

21 Claims, No Drawings

10-IMIDOYLPHENOTHIAZINES

BACKGROUND OF THE INVENTION

This invention pertains to carbon compounds which have drug and bio-affecting properties and to body treating compositions thereof. In particular, this invention relates to 10-imidoylphenothiazines which are effective as intestinal relaxants. The imidoylphenothiazines are also useful as antithrombogenic agents inasmuch as they inhibit platelet aggregation. Other features of the invention are a therapeutic process for producing intestinal relaxant and antithrombogenic effects in mammals by administration of the novel imidoylphenothiazines and pharmaceutical compositions containing same.

We have previously described 1-formimidoylindolines as being of interest as analeptics and analgesic agents; refer to Y. H. Wu and W. G. Lobeck, Jr., J. Med. Chem., 13, 975 (1970). We have now found that another class of amidines, the 10-imidoylphenothiazines and their salts, have intestinal relaxant and antithrombogenic activity.

SUMMARY OF THE INVENTION

This invention is concerned with amidines incorporating phenothiazine and more particularly with 10-imidoylphenothiazines of Formula I and non-toxic pharmaceutically acceptable acid addition salts thereof.

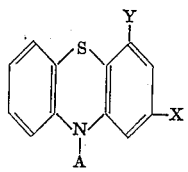

FORMULA I

The substances represented by Formula I are novel compositions of matter and are useful as intestinal relaxants and as inhibitors of platelet aggregation in mammals.

In Formula I, X and Y signify an independent member selected from the group comprised of hydrogen, trifluoromethyl, methylthio, lower alkyl, lower alkoxy, and halogen including chlorine, bromine, fluorine, and iodine.

A is a substituent selected from the group consisting of an imidoyl moiety represented by

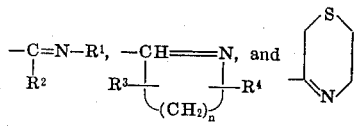

wherein $n$ signifies an integer of 3 to 5, $R^1$ is di(lower)alkyl-amino, lower alkyl, cycloalkyl of three to six carbon atoms inclusive; $R^2$ is hydrogen or lower alkyl and $R^3$ and $R^4$ are independently selected from the group consisting of hydrogen and lower alkyl.

It is to be understood that by the terms "lower alkyl" and "lower alkoxy" as used herein, it is meant that the carbon chain which comprises these groups include both straight and branched chain carbon radicals of one to four carbon atoms inclusive. Exemplary of these carbon chain radicals are methyl, ethyl, propyl, isopropyl, 1-butyl, 1-methylpropyl, 2-methylpropyl, and tert.-butyl. By the term "independently selected" as used herein it is means that the $R^3$ and $R^4$ substituents may or may not be identical.

The compounds of Formula I are basic and generally crystalline compounds which are practically insoluble in water, but fairly or readily soluble in most organic solvents and in aqueous solutions of organic or inorganic acids. Conversion of the imidoylphenothiazine bases of Formula I to corresponding non-toxic pharmaceutically acceptable acid addition salts is accomplished by admixture of the base with a selected acid in an inert organic solvent such as ethanol, benzene, ethyl acetate, ether, halogenated hydrocarbons and the like. It is to be understood that, as used herein, the term "non-toxic pharmaceutically acceptable acid addition salts" refers to a combination of the compounds of Formula I with relatively non-toxic inorganic or organic acids, the anions of which are pharmaceutically effective in the usual dosages.

Some examples of inorganic or organic acids which may be employed to provide non-toxic pharmaceutically acceptable acid addition salts of amidines of Formula I are: sulfuric, phosphoric, hydrochloric, hydrobromic, hydroiodic, sulfamic, acetic, lactic, maleic, succinic, malic, fumaric, tartaric, citric, gluconic, glutaric, ascorbic, benzoic, cinnamic, isethionic and related acids.

One preferred method of salt preparation is to treat the base with substantially one chemical equivalent of hydrogen chloride in ethanol solution. The imidoylphenothiazine salt precipitates from the ethanolic solution upon the addition of anhydrous ether or chilling. Both the free base and salt forms of products of Formula I are useful for the purposes of the invention although salts are particularly preferred because of their general water solubility.

The imidoylphenothiazines of the present invention characterized by Formula I are prepared by a process which comprises reacting a phenothiazine having Formula II

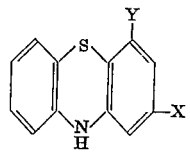

FORMULA II with a reactant selected from the group consisting of 3-thiomorpholinone and carboxamides of formulas

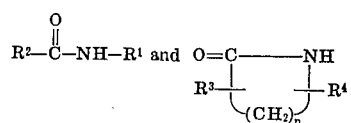

in the presence of phosphorous oxychloride in a suitable inert organic solvent. The symbols "X" and "Y" in the phenothiazine reactant and "$R^1$", "$R^2$", "$R^4$", and "$n$" in the carboxamide reactant have the meanings hereinabove described for Formula I. Suitable carboximide reactants by way of example are: N-alkylformamides such as N-methylformamide, N-ethylformamide, N-n-propylformamide, N-isopropylformamide, N-n-butylformamide, N-tert.-butylformamide; N-alkylcarboxamides such as N-methyl-acetamide, N-methyl-2-methylpropionamide, N-methylvaleramide, N-isopropylacetamide; N-cycloalkylformamides such as N-cyclopropylformamide, N-cyclobutylformamide, N-cyclopentylformamide, N-cyclohexylformamide, N-cycloalkylcarboximides such as N-cyclopropylacetamide, N-cyclohexylacetamide, N-cyclopentyl-2-methylpropionamide; 2,2-dialkyl-1-formylhydrazines such as 1-formyl-2,2-di-n-butylhydrazine, 1-formyl-2,2-di-isopropylhydrazine, 1-formyl-2-methyl-2-propylhydrazine; 2,2-dialkyl-1-alkanoylhydrazines such as 1-acetyl-2,2-di-n-butylhydrazine, 1-acetyl-2,2-diisopropylhydrazine, 1-acetyl-2-methyl-2-propylhydrazine, 1-butyryl-2,2-dimethylhydrazine; and the like. In addition, cyclic carboxamides (lactams) can also be employed and include, for example, 3-thiomorpholinone, 2-pyrrolidinone, 5-methyl-2-pyrrolidinone, 5,5-dimethyl-2-pyrrolidinone, 3-methyl-2-pyrrolidinone, 4-methyl-2-pyrrolidone, 5,5-di-n-butyl-2-pyrrolidinone, 2-oxohexamethyleneimine, 2-piperidone, 6-methyl-2-piperidone, 6,6-dimethyl-2-piperidone. Suitable phenothiazine reactants by way of example are: phenothiazine, 2-trifluoromethylphenothiazine, 2-bromophenothiazine, 2-iodophenothiazine, 2-methoxyphenothiazine, 2-ethoxyphenothiazine, 2-n-propoxyphenothiazine, 2-isopropoxyphenothiazine, 2-n-butoxyphenothiazine, 2-isobutoxyphenothiazine, 2-sec.-butoxyphenothiazine, 4-trifluoromethylphenothiazine, 4-chlorophenothiazine, 4-methoxyphenothiazine, 4-n-butoxyphenothiazine, 2,4-dibromophenothiazine, 2-methoxy-4-chlorophenothiazine, 2-n-butoxy-4-chlorophenothiazine, 2-methylthiophenothiazine, 4-methylthiophenothiazine, 2-methylphenothiazine, 2-isopropylphenothiazine, 4-methylphenothiazine, 2-methyl-4-chlorophenothiazine, 4-methyl-2-chlorophenothiazine and the like.

In carrying out the process for the preparation of the substances of Formula I, approximate stoichiometric quantities of the phenothiazine and appropriate carboxamide reactants and phosphorus oxychloride are mixed together in an inert aprotic solvent. Suitable and preferred solvents for carrying out the process are 1,2-dichloroethane and benzene. Other suitable solvents such as chloroform, carbon tetrachloride, 1,1-dichloroethane, toluene, hexane, and the like may be satisfactorily employed. The mode of addition of the reactants is not critical in carrying out the process. For example, a solution or suspension of a phenothiazine and a carboxamide in 1,2-dichloroethane can be added to a solution of phosphorus oxychloride or the sequence of addition may be reversed and a solution of phosphorus oxychloride in 1,2-dichloroethane can be added to a solution of the carboxamide and the phenothiazine. Alternatively, phosphorus oxychloride can be first added to the phenothiazine reactant and the carboxamide reactant then added. Another suitable adaptation of the process is the combination of phosphorus oxychloride with a carboxamide and the addition of this mixture to the phenothiazine reactant. Combination of the reactants provides an exothermic reaction and external cooling can be employed to moderate the reaction. This in not necessary, however, for the successful completion of the reaction. The reaction of a carboxamide with the phenothiazine reactant takes place in a facile manner when the reactants are combined and generally does not require prolonged heating for the formation of phenothiazine amidine compounds of Formula I. Although the reaction may be carried out at a temperature of about −35°C. to 100°C., we generally prefer to slowly add the phosphorus oxychloride to the phenothiazine and carboxamide reactants at a temperature in the range from about 25°–35°C. with efficient stirring and then stir the reaction mixture overnight at room temperature before isolating the product. The duration of the reaction is not critical and at a temperature in the preferred range, the reaction is essentially complete after about 2–16 hours. Illustrative of the preferred method of the preparation of the compounds of Formula I is the addition of phosphorus oxychloride in 1,2-dichloroethane to a mixture of phenothiazine and 5-methyl-2-pyrrolidinone in 1,2-dichloroethane at 25°C. which provides after stirring for 16 hr., 10-[2-(5-methyl-1-pyrrolinyl)]phenothiazine.

The compounds of the invention are new chemical substances which are useful as pharmacological agents. As such, they exert a papaverine-like intestinal relaxant effect. Apart from intestinal relaxant activity, the phenothiazines of Formula I have antithrombogenic properties as demonstrated by their ability to inhibit platelet aggregation caused by the addition of adenosine diphosphate to platelet rich plasma.

Intestinal relaxant activity of the compounds of the present invention can be measured in standard and accepted in vitro and in vivo pharmacological tests. One such test is carried out essentially as follows. A segment of rabbit ileum is suspended in oxygenated Tyrode's solution and affixed to a tension transducer for electronic recording of isometric contractions. After control responses to a standard dose of a spasmogen such as barium chloride (0.25 mg/ml) are established, the imidoylphenothiazine is added and the response to the spasmogen, in the presence of the imidoylphenothiazine, again determined. Test compound effect is measured as the percentage reduction in the response to the spasmogen, in the presence of the test compound, from the mean control response. A minimum of three trials are obtained with each of two to five different concentrations of the test compound. The data are expressed in log dose response curves and estimates made therefrom of the $EC_{50}$ (concentration causing 50 percent reduction in the response of the tissue to the spasmogen).

Papaverine, which is well known smooth muscle relaxant, has an $EC_{50}$ of 12.2 microgram per milliliter in this test. In general, the imidoylphenothiazines of the present invention are more potent than papaverine. As might be expected, certain of the compounds are more active than others. For example, 10-[2-(5-methyl-1-pyrrolinyl)]phenothiazine hydrochloride is 1.7 times more potent than papaverine. Another compound, 2-methoxy-10-[2-(5-methyl-1-pyrrolinyl)]-phenothiazine hydrochloride, has an $EC_{50}$ of 5.6 microgram per milliliter and is 2.2 times more potent than papaverine. Still another representative imidoylphenothiazine, 4-chloro-10-[2-(5-methyl-1- pyrrolinyl)]phenothiazine hydrochloride, is 3.1 times more potent than papaverine.

The intestinal relaxant activity of the amidines can also be measured in an in vivo cat preparation. In this test, a balloon is inserted through a small incision in the stomach of an anesthetized cat to a point about 10 cm. down the duodenum and intralumenal intestinal pressure changes recorded. Solutions or suspensions of the imidoylphenothiazine test agents are administered intraduodenally about 2 cm. beyond the balloon placed for recording intraduodenal pressure in volume doses of 1 milligram per kilogram of body weight. This means of administration mimics oral administration. Various doses of the test agent are administered and an inhibitory dose which will suppress intestinal relaxation by 50 percent of maximum is determined. This value is designated the $ID_{50}$.

Many of the imidoylphenothiazines of the present invention demonstrate intestinal relaxant activity in this test. For example, compounds which are more potent that papaverine and are particularly preferred for their strong intestinal relaxant activity are 10-[2-(5-methyl-1-pyrrolinyl)]-phenothiazine hydrochloride and 10-[2-(5,5-dimethyl-1-pryyolinyl)]-phenothiazine hydrochloride which have an $ID_{50}$ of 0.15 and 0.4 milligrams per kilogram of body weight respectively. Papaverine has an $ID_{50}$ of 2.6 milligrams per kilogram.

Antithrombogenic activity of the amidines of the present invention is measured in a standard test that is carried out essentially as described by Born, Nature, 194, 927 (1962) and O'Brien, J. Clin. Path., 15, 446 (1962). This test is a nephelometric method in which the change in turbidity of a specimen of platelet rich blood plasma is measured on causation of platelet aggregation by addition of a thrombogenic inducing agent such as adenosine diphosphate, epinephrine, or collagen. The amidines of the present invention are effective antithrombogenic agents according to this test at concentrations in the order of about 30 to 200 mcg./0.5 ml. platelet rich plasma. When this measurement is made on blood samples of an intact animal withdrawn before and after treatment with one of the test compounds, the antithrombogenic effect is readily observable.

The amidines of Formula I and salts thereof may be administered to mammals either singly or in combination with other pharmacological active ingredients. Routes of administration include parenteral as well as oral. Pharmacological effects including antithrombogenic and in particular intestinal relaxant are obtained at non-toxic effective doses of the compounds of Formula I ranging from about 0.01 to 10 milligrams per kilogram body weight. It is to be understood that the term "non-toxic effective dose" as used herein refers to the quantity of active ingredient necessary to produce the desired therapeutic effect without causing any harmful or deleterious side effects. Whether singly or in combination, they may be used in the usual pharmaceutical forms.

Oral toxicity values ($LD_{50}$) of the substances of Formula I in mice range from about 200 to 1,000 milligrams per kilogram of body weight. Representative $LD_{50}$ values, for example, for 10-[2-(5-methyl-1-pyrrolinyl)]phenothiazine, 10-[2-(5,5-dimethyl-1-pyrrolinyl)]phenothiazine, 4-chloro- 10-[2-(5-methyl-1-pyrrolinyl)]phenothiazine and 2-methoxy-10-[2-(5-methyl-1-pyrrolinyl)]phenothiazine are 258, 238, 477, and 204 milligrams per kilogram, respectively.

Pharmaceutical compositions may include, for example, solid preparations suitable for oral administration such as tablets, capsules, powders, granules, emulsions, suspensions, and the like. The solid preparations may comprise an inorganic carrier, e.g., talc, or an organic carrier, e.g., lactose, starch. Additives such as magnesium stearate (a lubricant) can also be included. Liquid preparations suitable for parental administration include solutions, suspensions or emulsions of the compounds of Formula I in combination with the usual diluent such as water, petroleum jelly, and the like, a suspension media such as polyoxyethylene glycols, vegetable oils and the like. The compositions also contain other additional ingredients such as absorbing agents, stabilizing agents, weighing agents and buffers.

The following examples are given by way of illustration and are not to be construed as limitations of this invention, variations of which are possible without departing from the scope and spirit thereof.

Example 1. 10-[2-(5-Methyl-1-pyrrolinyl)]phenothiazine hydrochloride.— Phosphorus oxychloride (15.3 g., 0.1 mole) in 50 ml. of 1,2-dichloroethane is added dropwise over 1.5 hr. to a stirred mixture of phenothiazine (19.9 g., 0.1 mole) and 5-methyl-2-pyrrolidinone (9.9 g., 0.1 mole) in 100 ml. of 1,2-dichloroethane at 25°–35°C. Stirring is continued for 15 hr. at room temperature and the mixture then poured into 200 g. of crushed ice and 100 ml. of 20 percent sodium hydroxide. The dichloroethane layer is separated and extracted with 100 ml. of 1.5N hydrochloric acid and subsequently with two 100 ml. portions of water. The acid extract and water wash are combined, basified with 40 percent sodium hydroxide, and extracted with chloroform. After drying over magnesium sulfate, the chloroform extract is concentrated and the residual oil distilled under reduced pressure through a 6 cm. column to provide 10.1 g. (28 percent yield) of 10-[2-(5-methyl-1-pyrrolinyl)]-phenothiazine free base as a viscous oil, b.p. 165°–175°C. at 0.2 mm. Hg.

The base is taken up in ethanol and acidified with ethanolic hydrogen chloride. Addition of ether to this solution provides analytically pure 10-[2-(5-methyl-1-pyrrolinyl)]phenothiazine hydrochloride, m.p. 264.5°–267.5°C. (corr.).

Analysis. Calcd. for $C_{17}H_{18}N_2S \cdot HCl$: C, 64.44; H, 5.41; N, 8.84; S, 10.12; Cl, 11.19. Found: C, 64.31; H, 5.45; N, 8.98; S, 10.05; Cl, 11.52.

Example 2. 10-(tert.-Butyliminomethyl)phenothiazine.—Phosphorus oxychloride (7.67 g., 0.05 mole) in 25 ml. of 1,2-dichloroethane is added dropwise in 0.5 hr. to a solution of phenothiazine (9.9 g., 0.05 mole) and N-tert.-butylformamide (5.06 g., 0.05 mole) in 100 ml. of 1,2-dichloroethane at a temperature of 25°–35°C. Stirring is continued for 16 hr. at room temperature and the mixture is then poured into 100 ml. of 20 percent sodium hydroxide and 200 g. crushed ice. The 1,2-dichloroethane layer is separated and extracted first with 100 ml. of 1.5N hydrochloric acid and then with two 100 ml. portions of water. The acid and water extract are combined and extracted with either and then basified with 40 percent sodium hydroxide affording a precipitate which is taken up in ether. After drying over magnesium sulfate, the ethereal extract is concentrated to provide a solid residue. Crystallization of this material from ethanol provides analytically pure 10-(tert.-butyliminomethyl)phenothiazine; yield 7.2 g. (51 percent), m.p. 122.5°–124°C. (corr.).

Analysis. Calcd. for $C_{17}H_{18}N_2S$: C, 72.30; H, 6.42; N, 9.92; S, 11.36. Found: C, 72.21; H, 6.47; N, 9.96; S, 11.40.

Example 3. 10-(Isopropyliminomethyl)phenothiazine.—Reaction of N-isopropylformamide, phenothiazine, and phosphorus oxychloride according to the procedure of Example 2 provides 10-(isopropyliminomethyl)phenothiazine which is crystallized from ethanol to analytical purity, m.p. 122.5°–124 °C. (corr.).

Analysis. Calcd. for $C_{16}H_{16}N_2S$: C, 71.60; H, 6.01; N, 10.44; S, 11.95. Found: C, 71.74; H, 5.94; N, 10.36; S, 11.93.

Example 4. 10-[7-(3,4,5,6-Tetrahydro-2H-azepinyl)]-phenothiazine hydrochloride.— Reaction of 2-oxohexamethyleneimine, phenothiazine, and phosphorus oxychloride in 1,2-dichloroethane according to the procedure of Example 2 provides the free base as an oil which on stirring with a minimal amount of n-heptane solidifies, m.p. 104°–106°C. The base is converted to the hydrochloride salt in the usual manner which is crystallized from ethanol-ether to provide analytically pure 10-[7-(3,4,5,6-tetrahydro-2H-azepinyl)]phenothiazine hydrochloride, m.p. 209.5°–211.5 °C. (corr.).

Analysis. Calcd. for $C_{18}H_{18}N_2S \cdot HCl$: C, 65.34; H, 5.79; N, 8.47; S, 9.69; Cl, 10.71. Found: C, 65.60: H, 5.85; N, 8.61; S, 9.77; Cl, 10.75.

Example 5. 10-[2-(5,5-Dimethyl-1-pyrrolinyl)]phenothiazine hydrochloride.— Reaction of 5,5-dimethyl-2-pyrrolidinone, phenothiazine, and phosphorus oxychloride in 1,2-dichloroethane according to the procedure of Example 2 provides 10-[2-(5,5-dimethyl-1-pyrrolinyl)]phenothiazine free base as a solid having a melting point of 143°–145°C. The base is converted to 10-[2-(5,5-dimethyl-1pyrrolinyl)] phenothiazine hydrochloride in the usual manner which is crystallized from ethanol-ether to analytical purity, m.p. 280°–281.5°C. (dec.)(corr.).

Analysis. Calcd. for $C_{18}H_{18}N_2S \cdot HCl$: C, 65.34; H, 5.79; N, 8.47; S, 9.69; Cl, 10.71. Found: C, 65.25; H, 5.75; N, 8.44; S, 9.75; Cl, 10.89.

Example 6. 10-(5,6-dihydro-2H-1,4-thiazine-3-yl)phenothiazine hydrochloride.— Reaction of 3-thiomorpholinone, phenothiazine, and phosphorus oxychloride in 1,2-dichloroethane according to the procedure of Example 2 provides the free base which is crystallized from ethanol, m.p. 84°–86°C. The base is converted to the hydrochloride salt in the usual manner and the salt purified by crystallization from ethanol-ether. Analytically pure 10-[5,6-dihydro-3-(2H-thiazinyl)]phenothiazine hydrochloride has a melting point of 214.5°–216.5°C. (dec.)(corr.).

Analysis. Calcd. for $C_{16}H_{14}N_2S_2 \cdot HCl$: C, 57.38; H, 4.51; N, 8.37; S, 19.15; Cl, 10.59. Found: C, 57.25; H, 4.72; N, 8.24; S, 18.86; Cl, 10.42.

Example 7. 10-(3,4,5,6-Tetrahydro-2-pyridyl)phenothiazine hydrochloride.— Reaction of 2-piperidone, phenothiazine, and phosphorus oxychloride in 1,2-dichloroethane according to the procedure of Example 2 provides a residual oil which triturated with a minimal amount of n-hexane affords the free base as a solid having a melting point of 90°–93 °C. The base is converted to the hydrochloride salt in the usual manner and the salt purified by crystallization from ethanol-ether. Analytically pure 10-(3,4,5,6-tetrahydro-2-pyridyl)phenothiazine hydrochloride has a melting point of 243.5°–247.5°C. (corr.).

Analysis. Calcd. for $C_{17}H_{16}N_2S \cdot HCl$: C, 64.44; H, 5.41; N, 8.84; S, 10.12; Cl, 11.19. Found: C, 64.46; H, 5.43; N, 8.73; S, 10.35; Cl, 11.26.

Example 8. 10-[(Dimethylhydrazono)methyl]phenothiazine hydrochloride.— Reaction of phenothiazine, 1-formyl-2,2-dimethylhydrazine, and phosphorus oxychloride in 1,2-dichloroethane according to the procedure of Example 2 provides free base as a solid, m.p. 92°–95°C. Conversion of the free base to the hydrochloride is carried out in the usual manner. Analytically pure 10-[dimethylhydrazono)methyl] phenothiazine hydrochloride is obtained by crystallization of the salt from ethanol-ether, m.p. 214.5°–216.5 °C. (dec.)(corr.).

Analysis. Calcd. for $C_{15}H_{15}N_3S \cdot HCl$: C, 58.91; H, 5.27; N, 13.74; S, 10.48; Cl, 11.60. Found: C, 58.77; H, 5.41; N, 13.63; S, 10.35; Cl, 11.45.

Example 9. 1-(Cyclopentyliminomethyl)phenothiazine.— Reaction of cyclopentylformamide, phenothiazine, and phosphorus oxychloride in 1,2-dichloroethane according to the procedure of Example 2 provides the free base which solidifies on standing and is purified by crystallization from n-hexane. Analytically pure 1-(cyclopentyliminomethyl)phenothiazine has a melting point of 77°–79C. (corr.).

Analysis. Calcd. for $C_{18}H_{18}N_2S$: C, 73.43; H, 6.16; N, 9.52; S, 10.89. Found: C, 73.59; H, 6.14; N, 9.50; S, 11.05.

Example 10. 2-Methoxy-10-[2-(5-methyl-1-pyrrolinyl)]-phenothiazine hydrochloride.— Phosphorus oxychloride (4.6 g., 0.03 mole) is added in one portion to a mixture of 5-methyl-2-pyrrolidinone (3.0 g., 0.03 mole) and 2-methoxyphenothiazine (6.88 g., 0.03 mole) in 100 ml. of benzene. The mixture is stirred and refluxed for 16 hr. and then poured into 200 ml. of iced sodium hydroxide. The benzene layer is separated and the aqueous portion extracted with an additional 100 ml. portion of benzene. Benzene extracts are combined and extracted first with 200 ml. of 1.5N hydrochloric acid and then with 100 ml. of water. Aqueous and acid extracts are combined and washed with 100 ml. of ether and then made basic with 40 percent sodium hydroxide. The basified solution is extracted with ether, the ethereal solution dried over magnesium sulfate and concentrated. The residual oil thus obtained is distilled through 6 cm. column under reduced pressure providing 5.6 g., (60 percent) of free base, b.p. 174°–183°C. at 0.08 mm. Hg.

The distilled free base is dissolved in 2-propanol and acidified with ethanolic hydrogen chloride. Addition of ether to the acidified solution provides 2-methoxy-10-[2-(5-methyl-1-pyrrolinyl)]phenothiazine hydrochloride which is crystallized from 2-propanol to analytical purity, m.p. 227.5°–228.5°C. (dec.)(corr.).

Analysis. Calcd. for $C_{18}H_{18}N_2OS \cdot HCl$: C, 62.32; H, 5.52; N, 8.08; Cl, 10.23. Found: C, 62.17; H, 5.60; N, 7.88; Cl, 10.33.

Example 11. 4-Chloro-10-[2-(5-methyl-1-pyrrolinyl)]-phenothiazine hydrochloride.— Reaction of 5-methyl-2-pyrrolidinone, 4-chlorophenothiazine, and phosphorus oxychloride in benzene according to the procedure of Example 10 provides the free base, b.p. 180°–190°C. at 0.15 mm. Hg. which solidifies and is crystallized from n-hexane, m.p. 162°–164°C.

The hydrochloride salt is prepared from the base in 2-propanol in the usual manner. Analytically pure 4-chloro-10-[2-(5-methyl-1-pyrrolinyl)]phenothiazine hydrochloride is obtained by crystallization from 2-propanol-ether and has a melting point of 258.5°–260.5 °C. (dec.)(corr.).

Analysis. Calcd. for $C_{17}H_{15}ClN_2S \cdot HCl$: C, 58.12; H, 4.59; N, 7.98; Cl, 10.09. Found: C, 58.37; H, 4.73; N, 7.90; Cl, 10.24.

Example 12. 10-[2-(5-Methyl-1-pyrrolinyl)]-2-trifluoromethylphenothiazine.— Reaction of 5-methyl-2-pyrrolidinone, 2-trifluoromethylphenothiazine, and phosphorus oxychloride in benzene according to the procedure of Example 10 provides the free base having a boiling point of 170°–180°C. at 0.15 mm. Hg. This fraction is redistilled affording analytically pure 10-[2-(5-methyl-1-pyrrolinyl)]-2-trifluoromethylphenothiazine, b.p. 180°–185°C. at 0.15 mm. Hg.

Analysis. Calcd. for $C_{18}H_{15}F_3N_2S$: C, 62.05; H, 4.34; N, 8.04; S, 9.21. Found: C, 62.16; H, 4.46; N, 8.13; S, 9.22.

Example 13. 10-[2-(1-Pyrrolinyl)]phenothiazine hydrochloride.— Phosphorus oxychloride (38.3 g., 0.25 mole) in 50 ml. of 1,2-dichloroethane is added in one portion to a stirred mixture of phenothiazine (49.8 g., 0.25 mole) and 2-pyrrolidinone (42.6 g., 0.5 mole) in 250 ml. of 1,2-dichloroethane. The mixture is stirred for 16 hr. at room temperature and then poured into a mixture of 200 ml. of 5N sodium hydroxide and 200 g. of crushed ice. The 1,2-dichloroethane layer is separated and extracted with two 150 ml. portions of 1.5N hydrochloric acid and then with 200 ml. of water. The combined acid-aqueous extracts are washed with ether, made basic with sodium hydroxide and extracted with chloroform. After drying over magnesium sulfate, the chloroform solution is concentrated and the residual material thus obtained stirred with 100 ml. of acetone, filtered, and the acetone treatment repeated on the filter residue. Concentration of the acetone filtrates provides a residue which is extracted with two 250 ml. portions of hot n-hexane. On standing, crude 10-[2-(1-pyrrolinyl)]phenothiazine (m.p. 80°–120°C.) separated from the solution. This material is further purified by crystallization from n-hexane providing the free base with a melting point of 87°–89°C.

The base is converted to the hydrochloride in the usual manner and the 10-[2-(1-pyrrolinyl)]phenothiazine hydrochloride crystallized from 2-propanol-ether to analytical purity, m.p. 253°–255°C. (dec.)(corr.).

Analysis. Calcd. for $C_{16}H_{14}S \cdot HCl$: C, 63.46; H, 4.99; N, 9.25; S, 10.59; Cl, 11.71. Found: C, 63.50; H, 4.95; N, 9.28; S, 10.70; Cl, 11.87.

Examples 14–64.— Additional exemplification of the 10-imidoylphenothiazines of the present invention is given below in Table I. These compounds, which further typify the nature of the present invention, are obtained from the indicated phenothiazine and carboxamide reactants according to the procedures described in Examples 1–13.

TABLE I.—10-IMIDOYLPHENOTHIAZINES

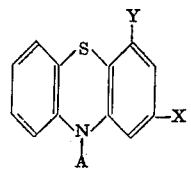

| Ex. No. | X | Y | A | Reactants |
|---|---|---|---|---|
| 14 | H | H | —CH=N—CH₃ | Phenothiazine and N-methylformamide. |
| 15 | H | H | —CH=N—▽ | Phenothiazine and N-cyclopropylformamide. |
| 16 | H | H | —CH=N—⬡ | Phenothiazine and N-cyclohexylformamide. |
| 17 | H | H | —CH=N—N(n-C₄H₉)₂ | Phenothiazine and 1-formyl-2,2-di-n-butylhydrazine. |
| 18 | H | H | —CH=N—N(i-C₃H₇)₂ | Phenothiazine and 1-formyl-2,2-di-isopropylhydrazine. |
| 19 | H | H | —CH=N—N(CH₃)(CH(CH₃)₂) | Phenothiazine and 1-formyl-2-methyl-2-isopropylhydrazine. |
| 20 | H | H | (pyrrolinyl with 4-CH₃) | Phenothiazine and 4-methyl-2-pyrrolidinone. |
| 21 | H | H | (pyrrolinyl with 3-CH₃) | Phenothiazine and 3-methyl-2-pyrrolidinone. |

TABLE I.—10-IMIDOYLPHENOTHIAZINES—Continued

| Ex. No. | X | Y | A | Reactants |
|---|---|---|---|---|
| 22 | H | H | pyrrolidine ring with =N–, 5,5-di-n-C$_4$H$_9$ substituents | Phenothiazine and 5,5-di-n-butyl-2-pyrrolidinone. |
| 23 | H | H | pyrrolidine ring with =N–, 5-n-C$_4$H$_9$ | Phenothiazine and 5-n-butyl-2-pyrrolidinone. |
| 24 | H | H | piperidine ring with =N–, 6-CH$_3$ | Phenothiazine and 6-methyl-2-piperidone. |
| 25 | H | H | piperidine ring with =N–, 6,6-di-CH$_3$ | Phenothiazine and 6,6-dimethyl-2-piperidone. |
| 26 | CF$_3$ | H | —CH=NC(CH$_3$)$_3$ | 2-trifluoromethylphenothiazine and N-tert.-butylformamide. |
| 27 | CF$_3$ | H | pyrrolidine ring with =N–, 5-CH$_3$ | 2-trifluoromethylphenothiazine and 5-methyl-2-pyrrolidinone. |
| 28 | CF$_3$ | H | 7-membered ring with =N– | 2-trifluorophenothiazine and 2-oxohexamethyleneimine. |
| 29 | F | H | pyrrolidine ring with =N–, 5-CH$_3$ | 2-fluorophenothiazine and 5-methyl-2-pyrrolidinone. |
| 30 | Br | H | 7-membered ring with =N– | 2-bromophenothiazine and 2-oxohexamethyleneimine. |
| 31 | I | H | pyrrolidine ring with =N–, 5-CH$_3$ | 2-iodophenothiazine and 5-methyl-2-pyrrolidinone. |
| 32 | CH$_3$O | H | thiomorpholine-like ring with S and =N– | 2-methoxyphenothiazine and 3-thiomorpholinone. |
| 33 | (CH$_3$)$_2$CHO | H | pyrrolidine ring with =N–, 5-CH$_3$ | 2-isopropoxyphenothiazine and 5-methyl-2-pyrrolidinone. |
| 34 | n-C$_4$H$_9$O | H | pyrrolidine ring with =N–, 5-CH$_3$ | 2-n-butoxyphenothiazine and 5-methyl-2-pyrrolidinone. |
| 35 | (CH$_3$)$_2$CHCH$_2$O | H | pyrrolidine ring with =N–, 5-CH$_3$ | 2-isobutoxyphenothiazine and 5-methyl-2-pyrrolidinone. |
| 36 | H | Cl | pyrrolidine ring with =N–, 5-CH$_3$ | 4-chlorophenothiazine and 5-methyl-2-pyrrolidinone. |
| 37 | F | F | pyrrolidine ring with =N–, 5-CH$_3$ | 2,4-difluorophenothiazine and 5-methyl-2-pyrrolidinone. |
| 38 | Cl | Cl | pyrrolidine ring with =N–, 5-CH$_3$ | 2,4-dichlorophenothiazine and 5-methyl-2-pyrrolidinone. |

TABLE I.—10-IMIDOYLPHENOTHIAZINES—Continued

| Ex. No. | X | Y | A (Product) | Reactants |
|---|---|---|---|---|
| 39 | CH₃O | Cl | pyrrolidine ring with =N-, 5-CH₃ | 2-methoxy-4-chlorophenothiazine and 5-methyl-2-pyrrolidinone. |
| 40 | CH₃O | Cl | —CH=N—cyclopentyl | 2-methoxy-4-chlorophenothiazine and N-cyclopentylformamide. |
| 41 | H | H | —C(CH₃)=N—CH₃ | Phenothiazine and N-methylacetamide. |
| 42 | H | H | —C(CH(CH₃)₂)=N—CH₃ | Phenothiazine and N-methyl-2-methylpropionamide. |
| 43 | H | H | —C((CH₂)₃CH₃)=N—CH₃ | Phenothiazine and N-methylvaleramide. |
| 44 | H | Cl | —C(CH₃)=N—CH₃ | 4-chlorophenothiazine and N-methylacetamide. |
| 45 | H | H | —C(CH₃)=N—cyclopropyl | Phenothiazine and N-cyclopropylacetamide. |
| 46 | H | H | —C(CH₃)=N—cyclohexyl | Phenothiazine and N-cyclohexylacetamide. |
| 47 | H | H | —C(CH(CH₃)₂)=N—cyclopentyl | Phenothiazine and N-cyclopentyl-2-methylpropionamide. |
| 48 | H | H | —C(CH₃)=N—N(n-C₄H₉)₂ | Phenothiazine and 1-acetyl-2,2-di-n-butylhydrazine. |
| 49 | H | H | —C(CH₃)=N—N(CH₃)₂ | Phenothiazine and 1-acetyl-2,2-dimethylhydrazine. |
| 50 | H | H | —C(CH₂CH₂CH₃)=N—N(CH₃)₂ | Phenothiazine and 1-butyryl-2,2-dimethylhydrazine. |
| 51 | CH₃S | H | —C(CH₃)=N—CH₃ | 2-methylthiophenothiazine and N-methylacetamide. |
| 52 | H | CH₃S | —C(CH₃)=N—CH₃ | 4-methylthiophenothiazine and N-methylacetamide. |
| 53 | CH₃ | H | —C(CH₃)=N—CH₃ | 2-methylphenothiazine and N-methylacetamide. |
| 54 | n-C₄H₉ | H | —C(CH(CH₃)₂)=N—cyclopentyl | 2-n-butylphenothiazine and N-cyclopentyl-2-methylpropionamide. |
| 55 | CH₃S | H | pyrrolidine ring with =N-, 5-CH₃ | 2-methylthiophenothiazine and 5-methyl-2-pyrrolidinone. |
| 56 | H | CH₃S | pyrrolidine ring with =N-, 5-CH₃ | 4-methylthiophenothiazine and 5-methyl-2-pyrrolidinone. |
| 57 | CH₃ | H | pyrrolidine ring with =N-, 5,5-(CH₃)₂ | 2-methylphenothiazine and 5,5-dimethyl-2-pyrrolidinone. |
| 58 | H | CH₃ | pyrrolidine ring with =N-, 5,5-(CH₃)₂ | 4-methylphenothiazine and 5,5-dimethyl-2-pyrrolidinone. |
| 59 | (CH₃)₂CH | H | pyrrolidine ring with =N-, 5,5-(CH₃)₂ | 2-isopropylphenothiazine and 5,5-dimethyl-2-pyrrolidinone. |
| 60 | CH₃ | Cl | pyrrolidine ring with =N-, 5-CH₃ | 2-methyl-4-chlorophenothiazine and 5-methyl-2-pyrrolidinone. |

TABLE I.—10-IMIDOYLPHENOTHIAZINES—Continued

| Ex. No. | Product X | Y | A | Reactants |
|---|---|---|---|---|
| 61 | H | H | $-\underset{\underset{CH_3}{\mid}}{C}=N-CH(CH_3)_2$ | Phenothiazine and N-isopropylacetamide. |
| 62 | CH₃O | H | $-\underset{\underset{CH_3}{\mid}}{C}=N-CH_3$ | 2-methoxyphenothiazine and N-methylacetamide. |
| 63 | CH₃ | H | $-\underset{\underset{CH_3}{\mid}}{C}=N-\!\!\!\triangleleft$ | 2-methoxyphenothiazine and N-cyclopentylacetamide. |
| 64 | H | Cl | $-\underset{\underset{CH_3}{\mid}}{C}=N-\!\!\!\triangleleft$ | 4-chlorophenothiazine and N-cyclopentylacetamide. |

Example 65. Pharmaceutical Compositions.— The 10-imidoylphenothiazines characterized by Formula I are compounded with pharmacologically acceptable carriers to provide compositions useful in the present invention. Typical of the pharmaceutical compositions are the following:

a. Tablets.— The amidines of Formula I are compounded into tablets according to the following example:

| Materials | Amount |
|---|---|
| 10-[2-(5-Methyl-1-pyrrolinyl)]phenothiazine hydrochloride | 56.5 g. |
| Magnesium stearate | 1.3 g. |
| Corn starch | 12.4 g. |
| Corn starch pregelatinized | 1.3 g. |
| Lactose | 178.5 g. |

The foregoing materials are blended in a twin-shell blender and then granulated and pressed into tablets employing 250 mg. each. Each tablet contains 50 milligrams of active ingredient. The tablet may be scored and quartered so that a unit dose of 12.5 mg. of active ingredient may be conveniently obtained.

b. Capsules.— The amidines of Formula I are compounded into capsules according to the following example:

| Materials | Amount |
|---|---|
| Active ingredient | 125.0 mg. |
| Lactose | 146.0 mg. |
| Magnesium stearate | 4.0 gm. |

The foregoing materials are blended in a twin-shell blender and then filled into No. 1 hard gelatin capsules. Each capsule contains 125 gm. of active ingredient.

c. Solution for Oral or Parenteral Administration.— A sterile aqueous solution having a concentration of 40 milligrams per kilogram of 10-[2-(5-methyl-1-pyrrolinyl)]phenothiazine hydrochloride is prepared by dissolving 400 grams of the substance in 9 liters of water for injection, U.S.P., adjusting the pH to 5.5 with diluent aqueous sodium hydroxide and dilution to 10 liters. This solution is then filtered sparkling clear and filled into 2 ml. glass ampoules and sealed.

While several specific embodiments are disclosed in the foregoing specification, it will be appreciated that other modifications may be made without departing from the spirit and scope of the appended claims.

What is claimed is:

1. A compound selected from the group consisting of 10-imidoylphenothiazines having the formula

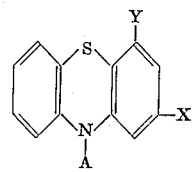

and a non-toxic pharmaceutically acceptable acid addition salt thereof wherein

X and Y are independently selected from the group consisting of hydrogen, halogen, methylthio, trifluoromethyl, lower alkyl, or lower alkoxy of one to four carbon atoms inclusive;

A is selected from the group consisting of

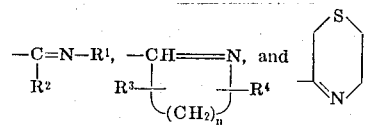

wherein $R^1$ is di(lower)alkylamino, lower alkyl or cycloalkyl of three to six carbon atoms inclusive;

$R^2$ is hydrogen or lower alkyl;

$R^3$ and $R^4$ are independent members selected from the group consisting of hydrogen and lower alkyl;

$n$ is an integer of 3 to 5; and wherein each of said lower alkyl groups contains 1 to 4 carbon atoms inclusive.

2. The compound of the group defined in claim 1 which is 10-[2-(1-pyrrolinyl)]phenothiazine.

3. The compound of the group defined in claim 1 which is 10-[2-(1-pyrrolinyl)]phenothiazine hydrochloride.

4. The compound of the group defined in claim 1 which is 10-[7-(3,4,5,6-tetrahydro-2H-azepinyl)]phenothiazine.

5. The compound of the group defined in claim 1 which is 10-[7-(3,4,5,6-tetrahydro-2H-azepinyl)]phenothiazine hydrochloride.

6. The compound of the group defined in claim 1 which is 10-(3,4,5,6-tetrahydro-2-pyridyl)phenothiazine.

7. The compound of the group defined in claim 1 which is 10-(3,4,5,6-tetrahydro-2-pyridyl)phenothiazine hydrochloride.

8. The compound of the group defined in claim 1 which is 10-[(dimethylhydrazono)methyl]phenothiazine.

9. The compound of the group defined in claim 1 which is 10-[(dimethylhydrazono)methyl]phenothiazine hydrochloride.

10. The compound of the group defined in claim 1 which is 10-[2-(5-methyl-1-pyrrolinyl)]-2-trifluoromethylphenothiazine.

11. The compound of the group defined in claim 1 which is 10-[2-(5-methyl-1-pyrrolinyl)]-2-trifluoromethylphenothiazine hydrochloride.

12. The compound of the group defined in claim 1 which is 10-[2-(5-methyl-1-pyrrolinyl)]phenothiazine.

13. The compound of the group defined in claim 1 which is 10-[2-(5-methyl-1-pyrrolinyl)]phenothiazine hydrochloride.

14. The compound of the group defined in claim 1 which is 10-[2-(5,5-dimethyl-1-pyrrolinyl)]phenothiazine.

15. The compound of the group defined in claim 1 which is 10-[2-(5,5-dimethyl-1-pyrrolinyl)]phenothiazine hydrochloride.

16. The compound of the group defined in claim 1 which is 2-methoxy-10-[2-(5-methyl-1-pyrrolinyl)]phenothiazine.

17. The compound of the group defined in claim 1 which is 2-methoxy-10-[2-(5-methyl-1-pyrrolinyl)]phenothiazine hydrochloride.

18. The compound of the group defined in claim 1 which is 4-chloro-10-[2-(5-methyl-1-pyrrolinyl)]phenothiazine.

19. The compound of the group defined in claim 1 which is 4-chloro-10-[2-(5-methyl-1-pyrrolinyl)]phenothiazine hydrochloride.

20. The compound of the group defined in claim 1 which is 10-(5,6-dihydro-2H-1,4-thiazin-3-yl)phenothiazine.

21. The compound of the group defined in claim 1 which is 10-(5,6-dihydro-2H-1,4-thiazin-3-yl)phenothiazine hydrochloride.

* * * * *